United States Patent [19]

Kouzaki et al.

[11] Patent Number: 5,999,279
[45] Date of Patent: *Dec. 7, 1999

[54] IMAGE FORMING APPARATUS HAVING AN MTF CORRECTION UNIT

[75] Inventors: Masahiro Kouzaki, Gamagori; Yoshinobu Hada, Aichi-Ken; Yukihiko Okuno, Toyokawa; Kentaro Katori, Toyokawa; Katsuyuki Hirata, Toyokawa, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,746

[22] Filed: Feb. 27, 1997

[30] Foreign Application Priority Data

Feb. 28, 1996 [JP] Japan ..................................... 8-041815

[51] Int. Cl.⁶ ........................................................ G03F 3/08
[52] U.S. Cl. .......................... 358/520; 358/448; 358/512; 358/516; 358/517; 358/518; 358/521; 358/530; 358/532; 358/538; 382/167
[58] Field of Search .................................... 358/520, 516, 358/517, 518, 521, 430, 512, 448, 532, 538; 395/102; 382/163, 167

[56] References Cited

U.S. PATENT DOCUMENTS

| | | |
|---|---|---|
| 5,016,096 | 5/1991 | Matsunawa et al. .................... 358/538 |
| 5,208,631 | 5/1993 | Jacobs et al. ............................ 355/204 |
| 5,343,311 | 8/1994 | Morag et al. ............................ 358/518 |
| 5,357,353 | 10/1994 | Hirota .................................... 358/530 |
| 5,365,352 | 11/1994 | Tajima .................................... 358/500 |
| 5,432,611 | 7/1995 | Haneda et al. .......................... 358/298 |
| 5,539,540 | 7/1996 | Spaulding et al. ...................... 358/518 |
| 5,594,558 | 1/1997 | Usami et al. ............................ 358/518 |
| 5,597,311 | 1/1997 | Yanagida et al. ....................... 434/358 |
| 5,867,634 | 2/1999 | Hirota et al. ............................ 395/102 |

FOREIGN PATENT DOCUMENTS 4-287569 10/1992 Japan .
4-342396 11/1992 Japan .

Primary Examiner—Leo H. Boudreau
Assistant Examiner—Kanji Patel
Attorney, Agent, or Firm—McDermott, Will & Emery

[57] ABSTRACT

An image forming apparatus which forms an image according to image data made up of pixel data on colors of pixel constituting an original image, characterized by comprising a color region discriminator for determining to which color region each pixel data belongs, an image region discriminator for determining whether the pixel data belongs to a uniform density region or whether it belongs to an edge portion, a corrective condition deciding unit for determining MTF corrective conditions for the image data of each color region depending on the discrimination results of both the color region discriminator and the image region discriminator, and an MTF correction unit for performing MTF corrections on the image data according to the MTF corrective conditions determined by the corrective condition deciding unit.

38 Claims, 12 Drawing Sheets

FIG. 7

| COLOR REGION | CONDITION | | |
|---|---|---|---|
| | HUE RANGE | LIGHTNESS RANGE | SATURATION RANGE |
| SPECIFIED REGION 1 | $h_{11} \sim h_{12}$ | $v_{11} \sim v_{12}$ | $c_{11} \sim c_{12}$ |
| 2 | $h_{21} \sim h_{22}$ | $v_{21} \sim v_{22}$ | $c_{21} \sim c_{22}$ |
| ⋮ | ⋮ | ⋮ | ⋮ |
| m | $h_{m1} \sim h_{m2}$ | $v_{m1} \sim v_{m2}$ | $c_{m1} \sim c_{m2}$ |
| ⋮ | ⋮ | ⋮ | ⋮ |
| n | $h_{n1} \sim h_{n2}$ | $v_{n1} \sim v_{n2}$ | $c_{n1} \sim c_{n2}$ |
| UNSPECIFIED REGION | REGIONS WHICH DO NOT BELONG TO ANY OF THE SPECIFIED REGIONS $1 \sim n$ | | |

| -1 | 0 | 1 |
|---|---|---|
| -2 | 0 | 2 |
| -1 | 0 | 1 |

5632

| -1 | -2 | -1 |
|---|---|---|
| 0 | 0 | 0 |
| 1 | 2 | 1 |

FIG. 9

| COLOR REGION | | UNIFORM DENSITY REGION | | EDGE PORTION | |
|---|---|---|---|---|---|
| | | SMOOTHING | EDGE EMPHASIZING | SMOOTHING | EDGE EMPHASIZING |
| SPECIFIED COLOR REGION | 1 (SKIN COLOR) | HARD | — | — | — |
| | 2 (SKY BLUE) | HARD | — | — | DONE |
| | 3 (LIGHT GRAY) | INTERMEDIATE | — | — | DONE |
| UNSPECIFIED COLOR REGION | | SOFT | — | — | DONE |

| 1/32 | 1/16 | 1/32 |
|---|---|---|
| 1/16 | 5/8 | 1/16 |
| 1/32 | 1/16 | 1/32 |

5822

| 1/16 | 1/8 | 1/16 |
|---|---|---|
| 1/8 | 1/4 | 1/16 |
| 1/16 | 1/8 | 1/16 |

5823

| 1/100 | 1/50 | 1/25 | 1/50 | 1/100 |
|---|---|---|---|---|
| 1/50 | 1/25 | 2/25 | 1/25 | 1/50 |
| 1/25 | 2/25 | 4/25 | 2/25 | 1/25 |
| 1/50 | 1/25 | 2/25 | 1/25 | 1/50 |
| 1/100 | 1/50 | 1/25 | 1/50 | 1/100 |

| 0 | 0 | $-1/4$ | 0 | 0 |
|---|---|---|---|---|
| 0 | 0 | 0 | 0 | 0 |
| $-1/4$ | 0 | 1 | 0 | $-1/4$ |
| 0 | 0 | 0 | 0 | 0 |
| 0 | 0 | $-1/4$ | 0 | 0 |

FIG. 13

| DT1 | DT2 | DT3 | DT4 | DT5 |
|---|---|---|---|---|
| DT6 | ... | ... | ... | ... |
| ... | ... | DT13 | ... | ... |
| ... | ... | ... | ... | DT20 |
| DT21 | DT22 | DT23 | DT24 | DT25 |

FIG. 14

| COLOR REGION | | dh | dv | dc |
|---|---|---|---|---|
| SPECIFIED COLOR REGION | 1 (SKIN COLOR) | 2×dh0 | 2×dv0 | 2×dc0 |
| | 2 (SKY BLUE) | dh0 | 2×dv0 | 2×dc0 |
| | 3 (LIGHT GRAY) | UNLIMITED | dv0 | 0.5×dc0 |
| UNSPECIFIED COLOR REGION | | dh0 | dv0 | dc0 |

Tb3

IMAGE FORMING APPARATUS HAVING AN MTF CORRECTION UNIT

BACKGROUND OF THE INVENTION (1) Field of the Invention

The present invention relates to an image forming apparatus, such as a digital color copying machine and a printer, which forms a full-color image.

(2) Related Art

In a digital color copying machine which reproduces an image according to image data obtained by reading an original with a scanner, digital image data of red (R), green (G), and blue (B) obtained by performing color-separation on an original image, are transformed into digital image data of cyan (C), magenta (M), and yellow (Y) used for image reproduction.

During the data processing, however, image noise is caused by low scanning accuracy, poor color reproducibility of the printer, and other factors, and that is why a correction unit is needed to perform corrections on the image data.

In a full-color reproduction image, unevenness is very noticeable in a uniform density region of a chromatic color, where smoothness is very important as well as resolution. However, if resolution is emphasized, roughness stands out even more in the uniform density region and makes the whole image unnatural, and if smoothness is emphasized, the edge portion is blurred and results in very poor resolution.

Japanese Laid-open Patent Application No. 4-342370 discloses an image processing method, in which the edge portions and the uniform density regions are discriminated based on changes in lightness image data. Here, the edge portions are subjected to edge-emphasizing to reproduce a clearer image, while the uniform density regions are subjected to smoothing to obtain a smoother image. By doing so, both resolution and smoothness are improved, and image noise is reduced.

According to this conventional image processing method, however, reproduction images tend to be unnatural because smoothing is performed with uniform intensity on the uniform density regions.

Image defects which are particularly noticeable are roughness and noise in the facial skin color. If the smoothing is intensified to eliminate roughness and noise, other uniform density regions which do not need smoothing much are also subjected to the intensified smoothing. As a result, the overall resolution becomes lower, making the reproduction image even more unnatural.

SUMMARY OF THE INVENTION

The object of the present invention is to provide an image forming apparatus which forms natural reproduction images by performing suitable corrections according to the necessity of corrections.

To achieve the above object, the image forming apparatus of the present invention comprises a color region discriminator for discriminating color regions of full-color image data, a corrective condition deciding unit for determining MTF (modulation transfer function) corrective conditions for each color region of the image data, and an MTF correction unit for performing MTF corrections on the image data in accordance with the MTF corrective conditions.

Since MTF corrections are performed on the image data according to the MTF corrections suitably determined for each color region of the original, a clear image can be formed with excellent reproducibility.

Here, the color region discriminator may comprise a color region signal generator for generating color region signals of hue, lightness, and saturation of each color region of the image data. The color region discriminator may compare the value of each color region signal with the ranges of the hue, lightness, and saturation which have been predetermined for each color region. Depending on the results from the region discriminator, the corrective condition deciding unit may determine corrective conditions which include both the intensity of smoothing for the image data of the uniform density regions and the necessity of the edge emphasizing for the image data of edge portions in each color region discriminated by the color region discriminator.

By doing so, necessary processes such as smoothing and edge emphasizing can be performed to achieve excellent reproducibility, according to both the information concerning the distinction between the edges and the uniform density regions, and the information concerning color regions.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7 is a table for discriminating color regions set in the color region discriminator in the region discriminator.

FIG. 8 shows an example of a first differential filter for detecting an edge set in the edge detection filter unit in the region discriminator.

FIG. 9 is a table for deciding corrective conditions set in the MTF corrective condition deciding unit in the image signal processing unit.

FIG. 11 shows an example of three smoothing filters set in the smoothing unit in the MTF correction unit.

FIG. 12 shows an edge emphasizing filter in the edge emphasizing unit in the MTF correction unit.

FIG. 13 shows another example of smoothing filter in the smoothing unit in the MTF correction unit.

FIG. 14 is a table for determining corrective conditions applied to the image data of a uniform density region when smoothing is performed.

DESCRIPTION OF THE PREFERRED EMBODIMENTS

The following is an explanation of the image forming apparatus of the present invention applied to a digital color copying machine.

(A) Overall Structure of the Digital Color Copying Machine

Figure 1:
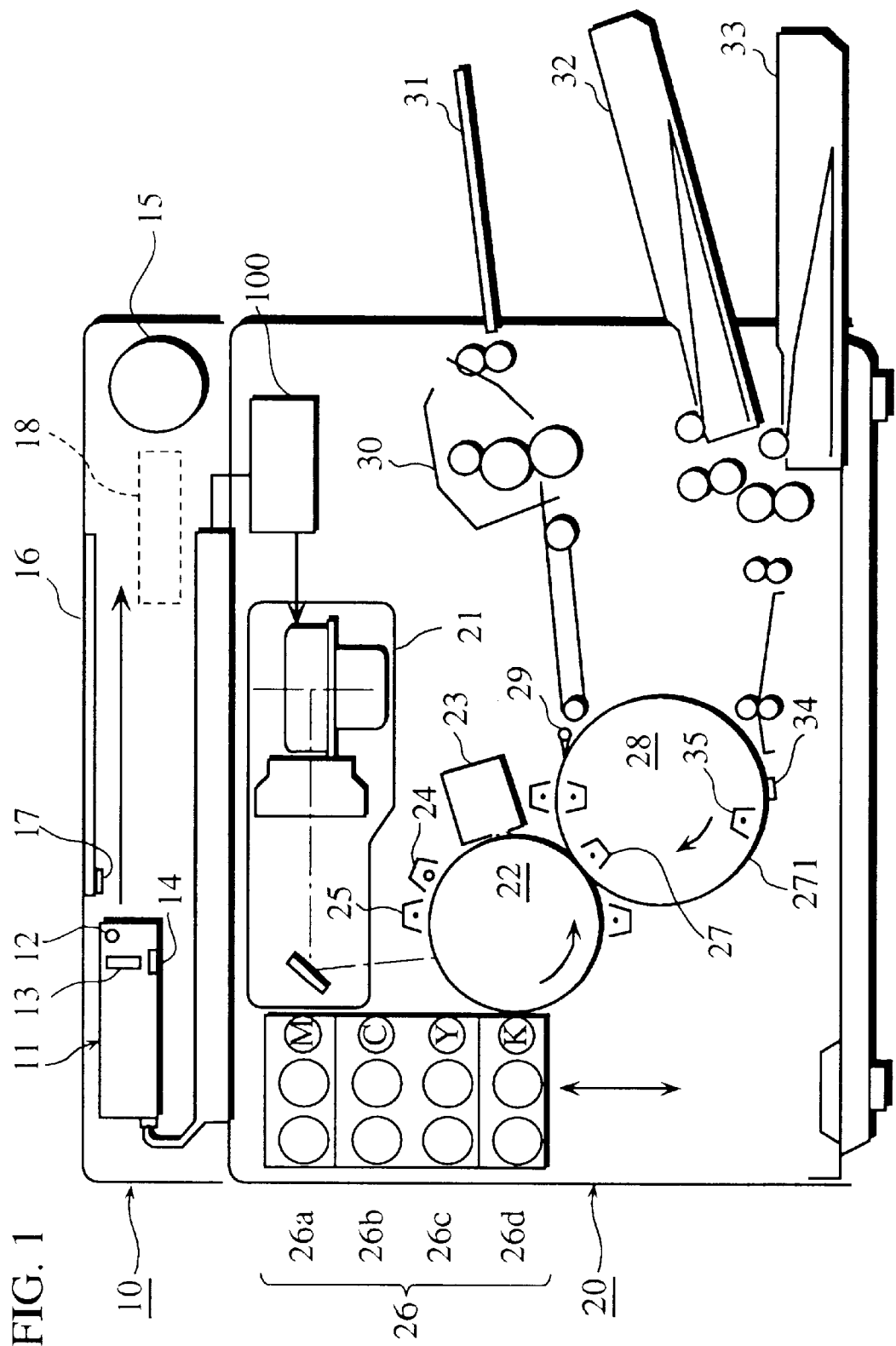
FIG. 1 shows the overall structure of the digital color copying machine of the present invention.

FIG. 1 shows the overall structure of the digital color copying machine in this embodiment of the present invention.

The digital color copying machine mainly comprises an image reading unit 10 for reading an original image and a printing unit 20 for reproducing the image on a copying paper according to the image data obtained by the image reading unit 10.

A scanner 11 in the image reading unit 10 includes an exposure lamp 12 for irradiating an original, a rod lens array 13 for gathering reflection light from the original, and a contact-type CCD color image sensor (hereinafter referred to simply as a CCD sensor) 14 for transforming the gathered light into electric signals. The scanner 11 is driven by a motor 15 and moves in the direction of the arrow (subscan direction) shown in FIG. 1. The scanner 11 scans the original put on a transparent platen 16. The CCD sensor 14 is provided with filters for red (R), green (G), and blue (B), and by switching these filters, the three-color data is read from the original image.

Figure 3:
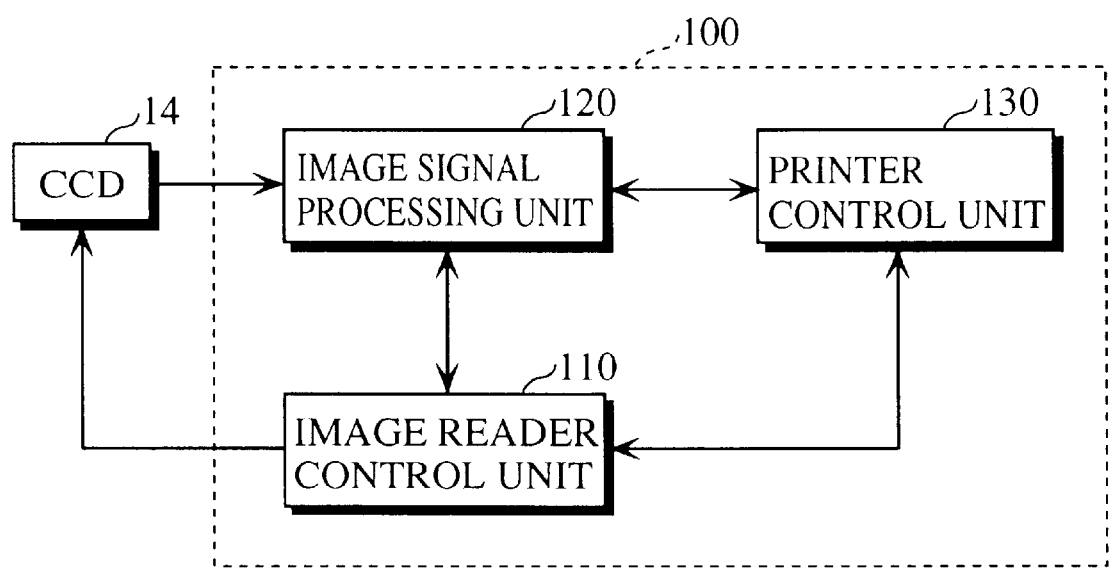
FIG. 3 is a block diagram of the control unit of the digital color copying machine.

The image data of the three colors, red (R), green (G), and blue (B), is subjected to data processing in an image signal processing unit 120 disposed in a control unit 100 (see FIG. 3). The image data is then converted into gradation data of the reproduction colors of yellow (Y), magenta (M), cyan (C), and black (K) (hereinafter, red, green, and black will be referred to simply as R, G, and B, respectively, and the reproductive colors, yellow, magenta, cyan, and black, as Y, M, C, and K, respectively).

This gradation data of the reproduction colors is outputted to a printer control unit 130 in the control unit 100 (see FIG. 3). The printer control unit 130 performs gamma correction of the gradation data and dither processing in accordance with the gradation characteristics of the photosensitive member if necessary, and it converts the corrected data into digital signals to drive a laser diode in a print head 21. A laser beam from the laser diode exposes the surface of a photosensitive drum 22 for one of the reproduction colors Y, M, C, and K.

Prior to exposure by the laser beam, the remaining toners on the surface of the photosensitive drum 22 has been removed by a cleaner 23, and the photosensitive drum 22 has been illuminated by an eraser lamp 24 and charged uniformly by a sensitizing charger 25. When the exposure is performed onto the photosensitive member in the uniformly charged state, an electrostatic latent image is formed on the surface of the photosensitive drum 22.

A toner developing unit 26 provided with toner developers 26a–26d corresponding to M, C, Y, and K is moved up and down by an elevating unit (not shown) in synchronization with the rotation of the photosensitive drum 22. One of the toner developers 26a–26d having the color corresponding to the formed electrostatic latent image is selected to develop the electrostatic latent image on the surface of the photosensitive drum 22.

Meanwhile, a transfer drum 28 is supplied with a copying paper (not shown) from a selected paper cassette 32 or 33. The front edge of the copying paper is then held by a chucking mechanism 34 disposed on the transfer drum 28, and electrostatically pulled by a suction charger 35 so that the copying paper does not slip on the transfer drum 28. The image developed on the photosensitive drum 22 is transferred to the copying paper on the transfer drum 28 by a transfer charger 27.

The above printing process is repeated for all the colors M, C, Y, and K, and when the printing of all the reproductive colors has been finished, a separation claw 29 is activated to separate the copying paper from the surface of the transfer drum 28.

Since the toner image transferred onto the copying paper can be easily removed just by touching it, the toner is fixed onto the surface of the copying paper by heating and pressing by a fixing unit 30. The copying paper with the fixed toner image is then discharged onto a paper tray 31.

An operation panel 18 is disposed on the front side of the image reading unit 10 so that is it easy for users to operate. The operation panel 18 comprises a ten-key pad for inputting the number of copies to be made and a start key for ordering to start copying.

Figure 2:
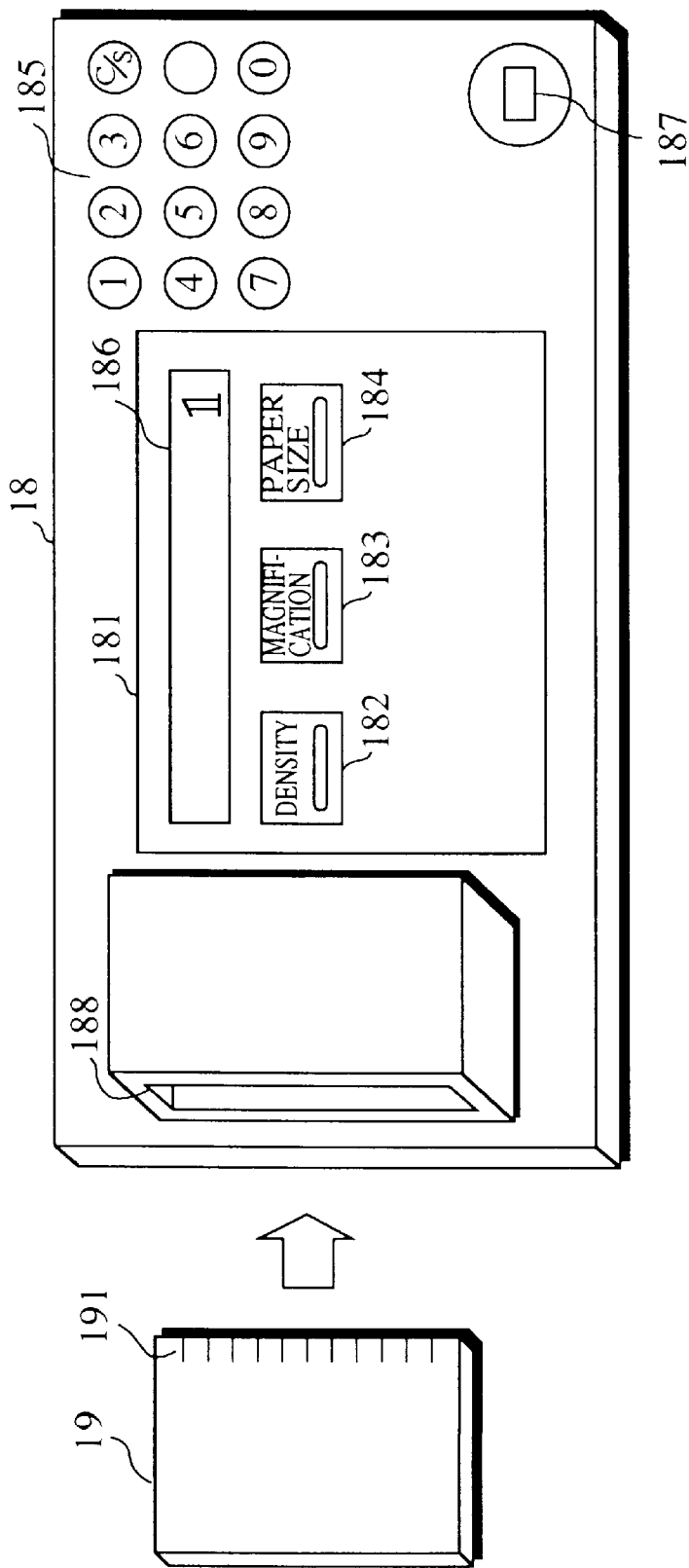
FIG. 2 shows the operation panel of the digital color copying machine.

FIG. 2 shows an example of the operation panel 18.

As shown in this figure, an LCD touch panel 181 is disposed in the center of the operation panel 18. The LCD touch panel 181 comprises a density setting key 182, a magnification setting key 183, and a paper size setting key 184. Input operation can be performed by touching the surfaces of these keys.

The number of copies can be set with a ten-key pad 185, and displayed on a set number display portion 186 in the LCD touch panel 181.

In this embodiment, the input operation can also be done by setting an IC card, as well as by touching the keys.

An IC card 19 holding input data of the number of copies, magnification, and paper size, is prepared, and inserted into a card reading unit 188 before copying is started. Electrodes 191 of the IC card are connected to the connecting terminal (not shown) of the card reading unit 188, and the data of the IC card are read by the control unit 100 to set the copying conditions automatically.

Thus, the tedious setting operation with the input keys can be avoided, and office work can be facilitated and speeded up.

The following explanation is for the structure of the control unit 100 of the digital color copying machine, with reference to the block diagram of FIG. 3.

The control unit 100 consists of an image reader control unit 110, an image signal processing unit 120, and a printer control unit 130.

The image reader control unit 110 controls operations of the image reading unit 10 when reading an original. The operations of the image reading unit 10 include switching on and off the CCD sensor 14 and the exposure lamp 12, and scanning the original by the scanner 11 driven by the motor 15.

The image signal processing unit 120 performs corrections on the image data of R, G, and B sent from the CCD sensor 14 in the scanner 11, and transforms the image data into the gradation data of the reproduction colors M, C, Y, and K to achieve the optimum reproduction images.

The printer control unit 130 controls the operation of each part of the printer unit 20. It performs gamma correction on the image data outputted from the image signal processing unit 120, controls the output of the printer head unit 21 by performing dither processing when a multi-value dither method is used as a gradation expressing technique, and controls the synchronization of the following actions: the paper supply from the paper cassette 32 or 33, the rotation of the photosensitive drum 22 and the transfer drum 28, the rise and fall of the toner developing unit 26, and the charge supply for each charger.

(B) Structure of the Image Signal Processing Unit

The following is an explanation of the structure of the image signal processing unit 120.

Figure 4:
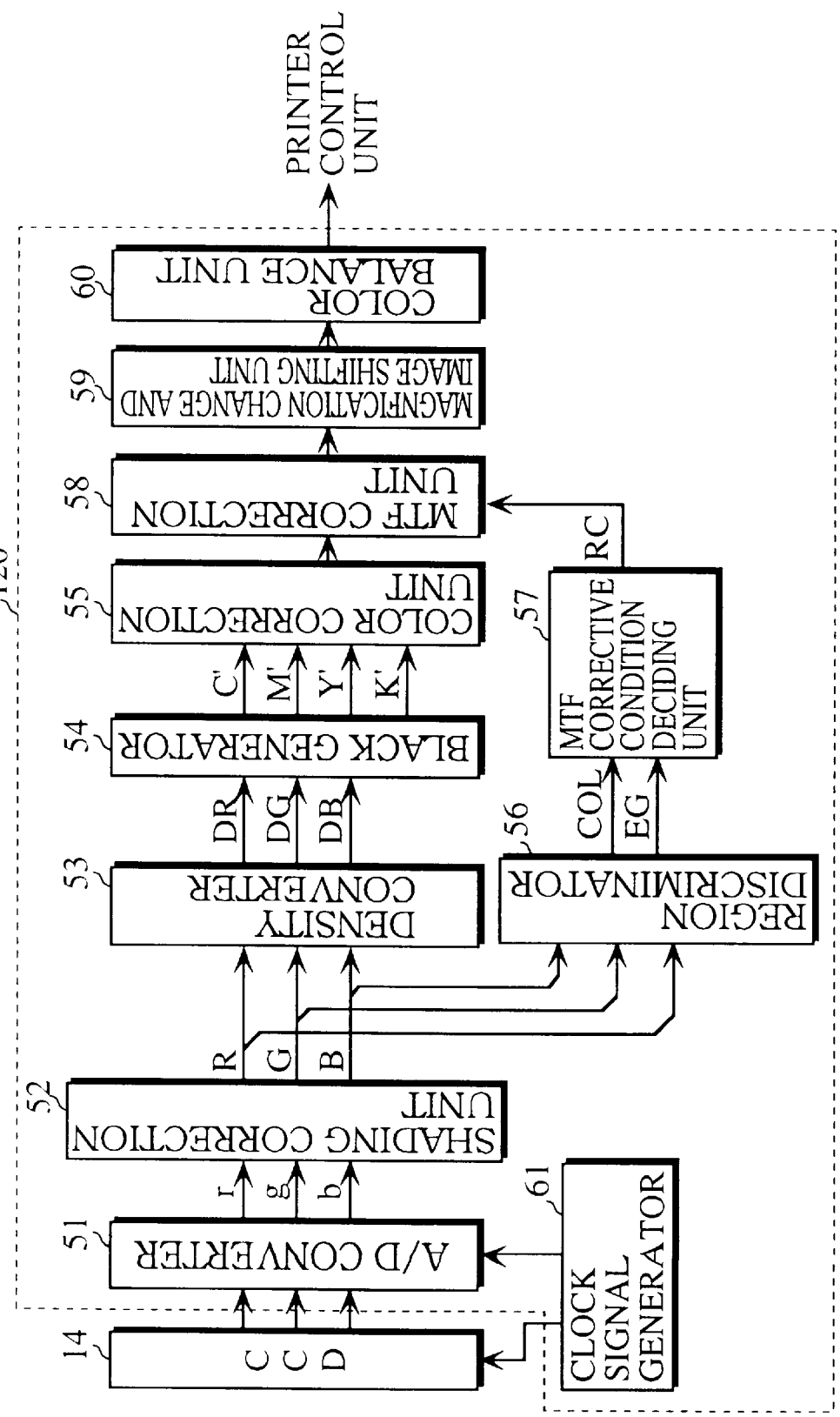
FIG. 4 is a block diagram of the image signal processing unit in the control unit.

FIG. 4 is a block diagram of the image signal processing unit 120.

The image signals obtained by the photoelectric conversion using the CCD sensor 14 in the scanner 11 are converted into multi-value digital image data of R, G, and B by an A/D convertor 51. A clock generator 61 generates clock signals to be sent to the CCD sensor 14 and the A/D converter 51. The CCD sensor 14 reads an original image in synchronization with the clock signals, and the A/D converter 51 converts it into image data corresponding to the pixels of the original image.

The converted image data is subjected to shading correction by a shading correction unit 52.

This shading correction is aimed at correcting uneven exposure by the exposure lamp 12 and irregular sensitivity of the CCD sensor 14. A white standard plate 17 (shown in FIG. 1) disposed at the edge portion of the platen 16 is pre-scanned to obtain image data of the standard white. Here, a multiplication ratio for each pixel of the white image is determined and then stored in the internal memory of the shading correction unit 52. When reading an original, corrections are performed by multiplying each pixel data by the multiplication ratio stored in the internal memory.

Since the image data which have been subjected to shading correction are reflectance data, they are converted into density data of an actual image by a density converter 53.

Although the photoelectric conversion characteristics of the output data from the CCD sensor 14 are proportional to the incident strength (reflection ratio) by the exposure lamp 12, the relationship between the reflection ratio and the density of the original image can be represented by a logarithmic curve. According tp this logarithmic curve, the density converter 53 converts the reflectance data from the CCD sensor 14 into density data which corresponds to the density of the original image.

The density data thus obtained is inputted to a black generator 54 to generate black color data K'.

This black color generation is necessary, because pure black is hard to reproduce with the overlapping of cyan, magenta, and yellow toners, due to the influence of the spectral characteristics of each toner. From this point of view, the black color generating is performed as follows.

The data DR, DG, and DB received from the density converter 53 represent the density data of the color components R, G, and B, respectively, and are equal to the density data of the color components C', M', and Y' of cyan, magenta, and yellow, which are complementary to red, green, and blue.

Since black is obtained by overlapping cyan, magenta, and yellow, the minimum value of DR(C'), DG(M'), and DB(Y') can be taken as the black color data K'. Accordingly, the black color data K' can be represented by K'=MIN (DR, DG, DB). The black data K', together with the density data C'(DR), M'(DG), and Y'(DB), is sent to a color correction unit 55.

In order to perform corrections on the density data C', M', Y', and K', and to achieve excellent color reproducibility, the color correction processing unit 55 performs an undercolor removal process (UCR process), a black print process (BP process), and a masking process.

(a) UCR Process and BP Process

Figure 5:
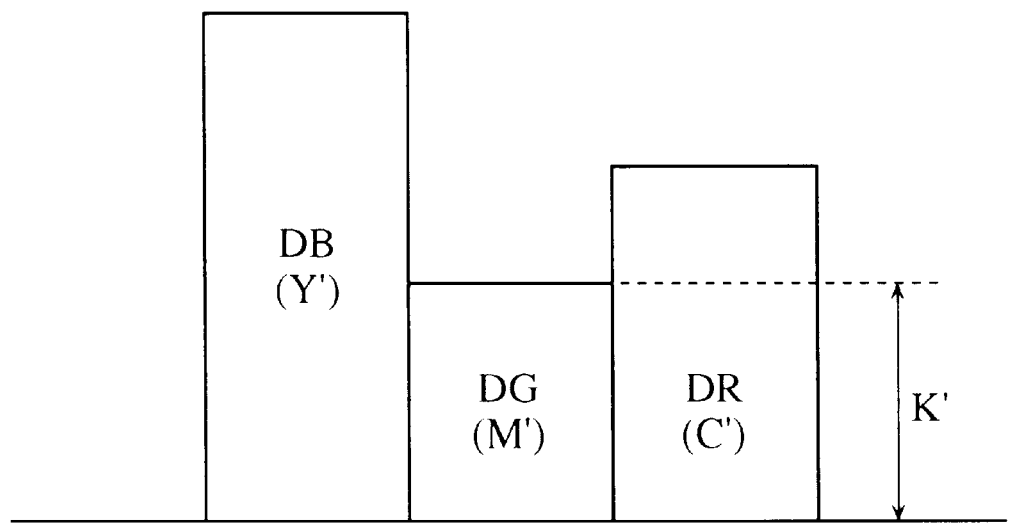
FIG. 5 shows the process of determining the black density, according to the density data of red, green, and blue.

As described above, the density data K' of the black color generated by the black generator 54 are a common part among DR, DG, and DB. Logically, the density data of cyan, magenta, and yellow, which are complementary to R, G, and B, can be given by subtracting the black color data K' from each of the density data DR, DG, and DB. As can be seen from FIG. 5, however, the density of each color component is drastically lowered, and images with very low saturation are reproduced, with black portions standing out from the rest of the image.

To adjust the density values using coefficients α and β, the density data of C, M, and Y are given by subtracting α·K' from the density data DR, DG, and DB, while the black density data K is given by β·K'.

The former is called the undercolor removal process (UCR process), and the latter is called the black print process (BP process), which are represented by the following equations:

UCR Processing $$C = C' - \alpha \cdot K'$$

$$M = M' - \alpha \cdot K'$$

$$Y = Y' - \alpha \cdot K'$$

BP Processing $$K = \beta \cdot K'$$

In the above equations, the coefficient α is a UCR ratio, and the value of each color data becomes smaller as the UCR ratio becomes larger. The coefficient β is a BP ratio, and the value of the black data becomes larger as the BP ratio becomes larger.

Accordingly, the UCR ratio and the BP ratio have influence on the saturation of the chromatic colors and the visibility of achromatic colors in a reproduction image. Suitable values for reproducing an image are set in the color correction unit 55 in advance.

(b) Masking Process

As described above, R, G, and B are complementary to C, M, and Y, and the corresponding colors in both color groups have an equal density. In practice, however, the transmission characteristics of the filters for R, G, and B in the CCD sensor 14 do not change proportionally with the reflection characteristics of the toners of C, M, and Y in the printing unit 20. Therefore, it is necessary to match both characteristics with one another, so that the color reproducibility becomes as good as possible.

The values of the density data of C, M, and Y determined by the UCR process described above are given by subtracting the predetermined density of K from the density values of C', M', and Y', i.e., the density values DR, DG, and DB. For this reason, a matching process is necessary, and a linear correction is performed according to a linear masking equation (2) using a masking coefficient M shown by an equation (1).

$$M = \begin{pmatrix} m_{11} & m_{12} & m_{13} \\ m_{21} & m_{22} & m_{23} \\ m_{31} & m_{32} & m_{33} \end{pmatrix} \quad (1)$$

$$\begin{pmatrix} C \\ M \\ Y \end{pmatrix} = M \begin{pmatrix} C' - \alpha \cdot K' \\ M' - \alpha \cdot K' \\ Y' - \alpha \cdot K' \end{pmatrix} \quad (2)$$

Each element of $M_{11}$–$M_{33}$ of the masking coefficient M in Equation (1) is determined by the transmission characteristics of the filters and the reflection characteristics of the toners.

With the linear masking equation shown by Equation (2), the UCR process is also performed.

Having been logically determined by the BP process, the black density data K does not need to be converted here.

The density data of C, M, Y, and K which have been subjected to color correction by the color correction unit 55 are sent to the MTF correction unit 58.

The MTF correction unit 58 performs smoothing and edge emphasizing on the image data of the reproduction colors using suitable spatial filters selected according to the corrective conditions determined by the MTF corrective condition deciding unit 57. The MTF corrective condition deciding unit 57 determines the corrective conditions according to the information on the color regions and uniform/edge regions discriminated by the region discriminator 56.

The following is a detailed explanation of the MTF corrections by the region discriminator 56, the MTF corrective condition deciding unit 57, and the MTF correction unit 58.

Figure 6:
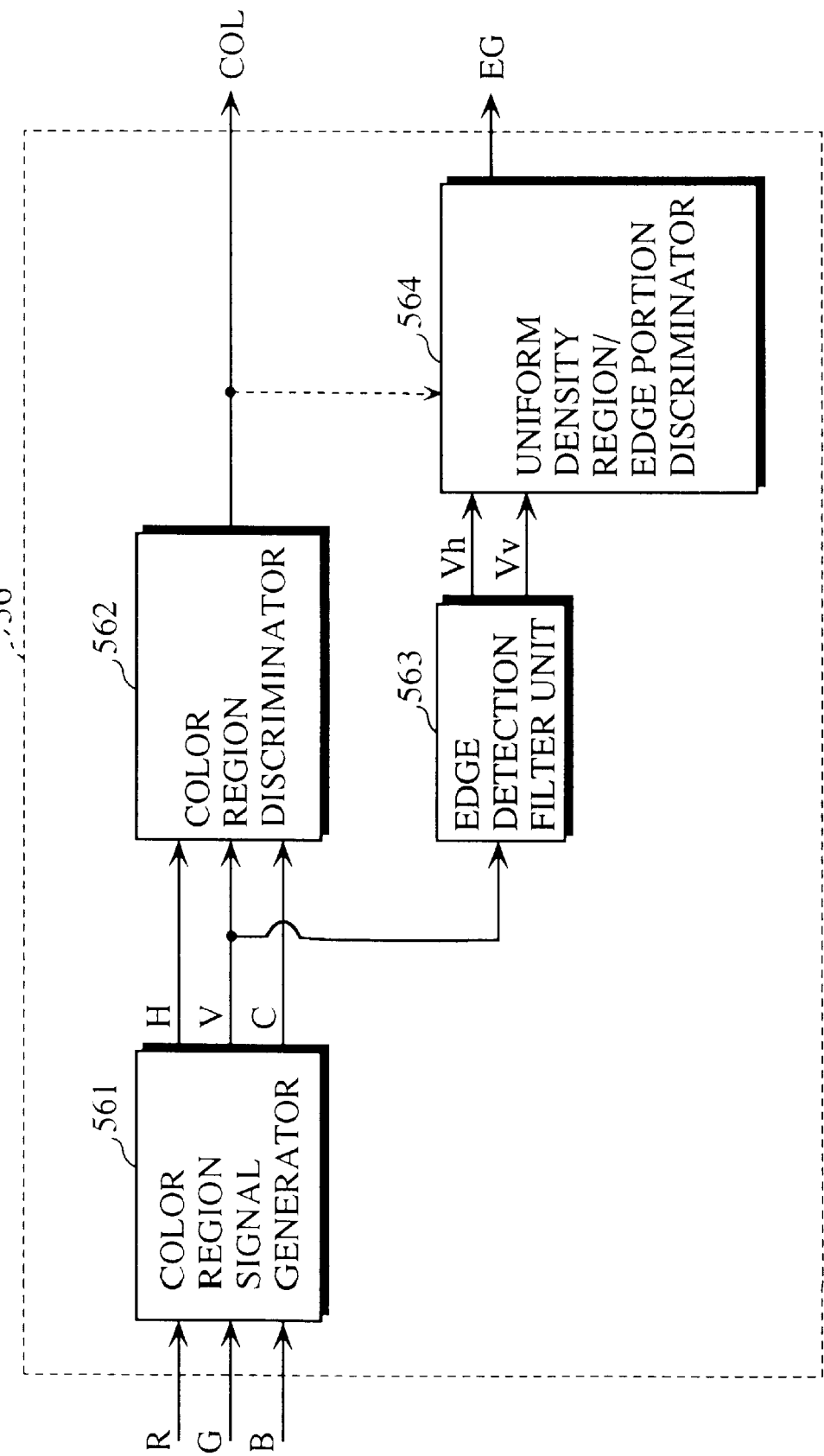
FIG. 6 is a block diagram of the region discriminator in the image signal processing unit.

FIG. 6 shows a block diagram of the region discriminator 56.

As shown in the figure, the region discriminator 56 comprises a color region signal generator 561, a color region discriminator 562, a edge detection filter unit 563, and a uniform density region/edge portion discriminator 564.

The reflectance data of R, G, and B, which have been subjected to shading correction by the shading correction unit 52, are inputted into the color region signal generator 561 (see FIG. 4). Three color region signals having the values of hue (H*), lightness (V), and saturation (C*), are generated from the reflectance data of R, G, and B.

The values H*, V, and C* of the color region signals are generally given by the following Equations (3) to (5).

$$\begin{pmatrix} V \\ W1 \\ W2 \end{pmatrix} = \begin{pmatrix} a_{11} & a_{12} & a_{13} \\ a_{21} & a_{22} & a_{23} \\ a_{31} & a_{32} & a_{33} \end{pmatrix} \times \begin{pmatrix} R \\ G \\ B \end{pmatrix} \quad (3)$$

$$H^* = \tan^{-1}(W2/W1) \quad (4)$$

$$C^* = (W1^2 + W2^2)^{1/2} \quad (5)$$

In the color region signal generator 561, V and W1 and W2 are determined by Equation (3), and H* and C* are given respectively by Equations (4) and (5) using the values of W1 and W2.

The obtained values H*, V, and C* of the color region signals are inputted into the color region discriminator 562.

The color region discriminator 562 determines to which color region the image data belongs, according to the values H*, V, and C* of the color region signals. More specifically, the color region discriminator 562 contains a table Tb1 for discriminating color regions depending on the ranges of H*, V, and C* as shown in FIG. 7.

In the column showing the hue range in the table Tb1, "hm1–hm2" (m=1, 2, ... n) indicates that the hue value H* in the "m"th specified region is in the range of hm1 to hm2. Likewise, in the other two columns, "vm1–vm2" and "cm1–cm2" indicate the ranges of the lightness value V and the saturation value C* in the "m"th specified region.

Effectively the specified color regions are determined by setting the ranges of each color region signal so that color regions require MTF corrections different from the rest. For instance, since hard smoothing is effective on the skin color region, the maximum and minimum values of H*, V, and C* are determined so that the skin color region is included in one of the specified color regions.

Color regions which do not belong to any of the specified color regions is discriminated as an unspecified color region.

According to the values H*, V, and C* outputted from the color region signal generator 561, it is determined to which color region each image data belongs, with reference to the table Tb1. The signals of the color regions determined in this way are outputted to the MTF corrective condition deciding unit 57 (in FIG. 4) as the color region information COL.

Meanwhile, the lightness signal (V) from the color region signal generator 561 is inputted to the edge detection filter unit 563. The edge detection filter unit 563 comprises first differential filters 5631 and 5632 for edge detection. These filters are 3×3 in the longitudinal and traverse directions. The first differential result Vh in the traverse direction and the first differential result Vv in the longitudinal direction are outputted to a uniform density region/edge portion discriminator 564.

The uniform density region/edge portion discriminator 564 determines whether a central pixel belongs to a uniform density region or whether it belongs to an edge portion, according to the first differential data Vh of the lightness (V) in the traverse direction and the first differential data Vv of the lightness (V) in the longitudinal direction.

The mean value Va of the absolute values of the first differential data Vh and Vv is determined (Va=(|Vh|+|Vv|)/2), and then the value of Va is compared with a predetermined threshold value Vth. If the comparison result is Va<Vth, the central pixel is judged to belong to a uniform density region. If the comparison result is Va≧Vth, it is judged to belong to an edge portion.

In doing so, it is assumed that the lightness changes dramatically on the boundary between a uniform density region and an edge portion, and when the first differential value of the lightness is greater than the predetermined value, the central pixel belongs to an edge portion. The mean value Va of the first differential values in the longitudinal and traverse directions is determined and compared with the threshold value Vth to enhance the accuracy in discriminating between edge portions and uniform density regions.

In this way, the uniform density region/edge portion discriminator 564 determines whether the inputted image data belongs to a uniform density region or whether it belongs to an edge portion, and the result is outputted to the MTF corrective condition deciding unit 57 (in FIG. 4) as uniform density region/edge portion information EG.

The MTF corrective condition deciding unit 57 determines the corrective conditions in the MTF correction unit 58, according to the color region information COL and the uniform density region/edge portion information EG.

The setting of the color regions by the color region discriminator 562 in the region discriminator 56 may vary depending on the MTF correction. In reproducing a full-color image, unevenness in the uniform density regions of the specified color ranges of the skin color, sky blue, and light gray is remarkably noticeable. Here, for ease of explanation, the color regions are divided into four regions, which are specified color regions 1, 2, and 3 corresponding to the skin color, sky blue, and light gray, and an unspecified color region (see FIG. 9). The MTF corrective conditions for each color region is determined in the following manner (a table corresponding to the color regions in FIG. 9 is set in the table Tb1 for determining color regions shown in FIG. 7, but this table is not shown in the drawings).

The internal memory of the MTF corrective condition deciding unit 57 stores a table Tb2 for determining corrective conditions as shown in FIG. 9. It is then determined whether the central pixel data belongs to a uniform density region or whether it belongs to an edge portion, according to the uniform density region/edge portion information EG outputted from the region discriminator 56.

(a) Processing of the Image Data of a Uniform Density Region.

In this case, no edge emphasizing is performed on all the color regions, but smoothing is performed with various degrees of strength depending on which specified color region the central pixel data belongs to.

In other words, hard smoothing is performed if the central pixel data is judged to belong to the specified color region 1 (skin color) or the specified color region 2 (sky blue) according to the color region information COL, and intermediate smoothing is performed if the central pixel data is judged to belong to the specified color region 3 (light gray). In the case where the central pixel data belongs to the unspecified color regions, hard smoothing is not required, and soft smoothing is performed to maintain a predetermined resolution (see the column of "uniform density region" in FIG. 9).

(b) Processing of the Image Data of an Edge Portion.

Because the image data of edge portions are blurred if smoothing is performed there, no smoothing is performed on all the color regions. Instead, edge emphasizing is performed to sharpen the edge portions. However, the edge emphasizing is not performed on all the edge portions. If the edge emphasizing is performed on the skin color region (the specified region 1 in FIG. 7), the facial part of a human image stands out from the rest of the image, making the reproduction image very unnatural. So, the edge emphasizing is specified not to be performed on the skin color region (see the column of "edge portion" in FIG. 9).

The MTF corrective condition deciding unit 57 sets corrective conditions according to the uniform density region/edge portion information EG and the color region information COL. According to the table Tb2, the necessity and the intensity of smoothing or edge emphasizing are decided. The corrective condition information RC is then sent to the MTF correction unit 58.

Figure 10:
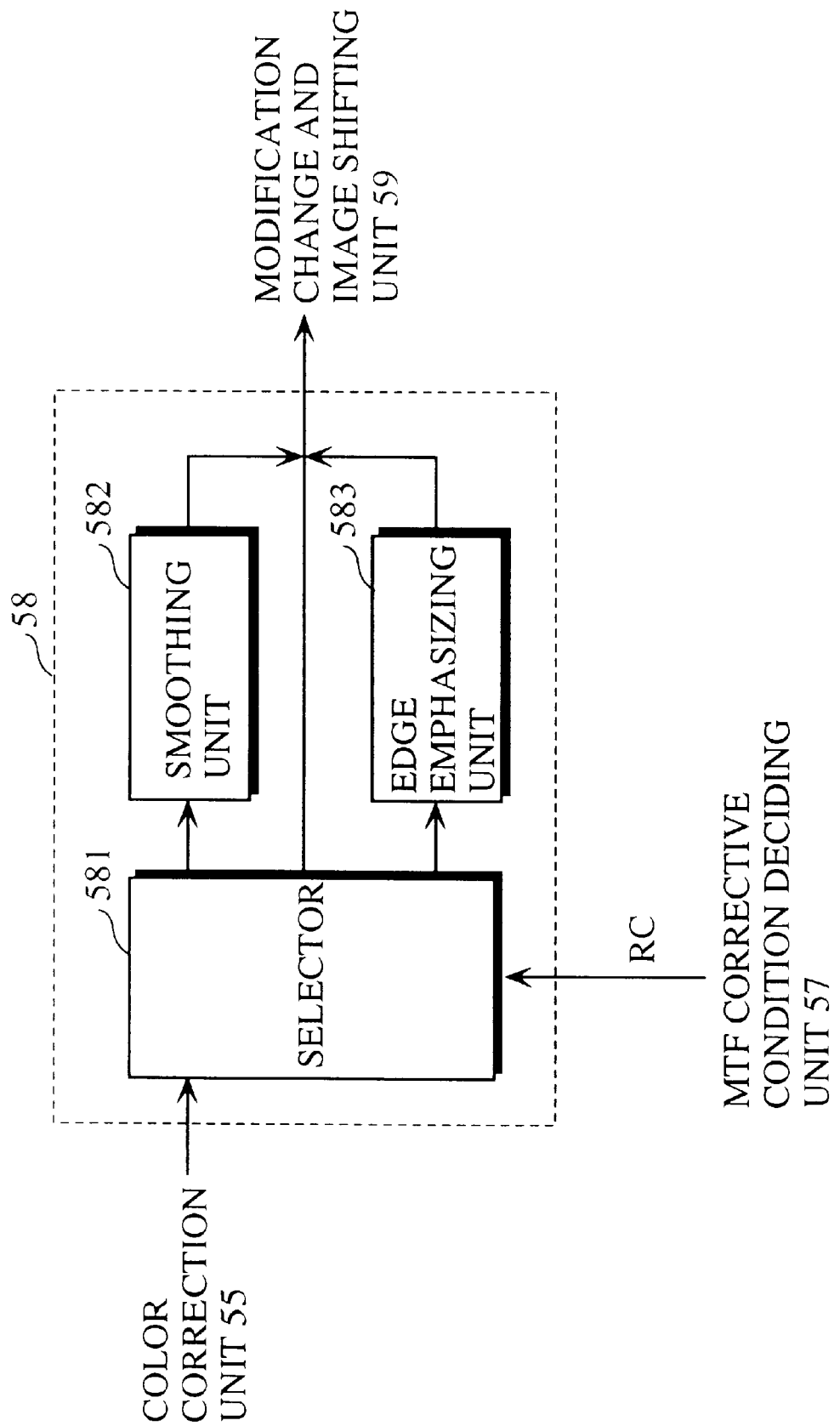
FIG. 10 is a block diagram of the MTF correction unit in the image signal processing unit.

FIG. 10 shows a block diagram of the MTF correction unit 58.

As shown in this figure, the MTF correction unit 58 consists of a selector 581, a smoothing unit 582, and an edge emphasizing unit 583.

The smoothing unit 582 comprises three smoothing filters 5821 to 5823 as shown in FIG. 11, to comply with the intensity of the smoothing, which increases in the order of reference numeral.

The edge emphasizing unit 583 comprises an edge emphasizing filter 5831 as shown in FIG. 14.

The selector 581 sends the image data from the color correction unit 55 to the smoothing unit 582 or the edge emphasizing unit 583 according to the corrective condition information RC supplied by the MTF corrective condition deciding unit 57. The image data is then subjected to filtering if necessary, or directly sent to the next step, which is a magnification change and image shifting unit 59.

If the corrective condition information RC is "hard smoothing/no edge emphasizing", the selector 581 sends the image data to the smoothing unit 582, and orders to start smoothing with the smoothing filter 5823.

Then, a method of moving averages with weighting addition is performed for the periphery pixels within the window of the smoothing filter 5823 by the smoothing unit 582 to reduce image noises using the smoothing filter 5823. In this way, very smooth reproduction image data can be produced.

If the corrective condition information RC is "no smoothing/edge emphasizing", the selector 581 sends the image data to the edge emphasizing unit 583, where the central pixel within the window of the edge emphasizing filter 5831 is emphasized by subjecting the periphery pixel in the longitudinal and traverse directions to subtraction using the edge emphasizing filter 5831.

If the corrective condition information RC is "no smoothing/no edge emphasizing", the selector 581 sends the image data directly to the next step, which is the magnification change and image shifting unit 59.

As described so far, the image data is subjected to various MTF corrections for the uniform density regions, edge portions, and color regions, in the MTF correction unit 58. The image data is then sent to the magnification change and image shifting unit 59 (FIG. 4), where the magnification is changed to a predetermined one or the reproduction image is shifted to a predetermined position. The image data is further sent to a color balance unit 60, where it is subjected to color balance, and then outputted to a printer control unit 130.

(C) Modifications

Although the present invention has been described by way of the above embodiment, it should be noted that the present invention is not limited to this embodiment and the following modifications can be made in the present invention.

(1) In the above embodiment, when discriminating color regions of image data by the color region discriminator 562 (FIG. 6) in the region discriminator 56, discrimination is performed on the image data of each pixel. However, if the central pixel is a part of noise and the color region of the central pixel is very different from the periphery pixels, the noise may be enlarged even more. From this point of view, the central pixel and its periphery pixels are averaged by an averaging filter in advance, and color regions are discriminated according to the averaged image data. Thus, color region discrimination can be performed more accurately, and more suitable corrective conditions can be set for each pixel.

(2) In the above embodiment, the region discriminator 56 converts the reflectance data of R, G, and B, into the color region signals having H*, V, and C* in the color region signal generator 561, and discriminates the color regions in accordance with the color region signals in the color region discriminator 562. The color region signals converted by the color region signal generator 561 does not necessarily belong to the HVC color space, and may belong to CIE (L*a*b*) uniform color space or CIE (L*u*v*) uniform color space.

These uniform color spaces are the color specification standards set by Commission Internationale de l'Eclairage (CIE). In these uniform color spaces, three stimulus values X, Y, and Z also defined by CIE are transformed into three coordinates in which perceptible color differences can be represented as precisely as possible. The former uniform color space, CIELAB for short, is effective especially when mixing dyestuffs or pigments of different colors. The latter uniform color space, CIELUV for short, is effective when mixing color lights additively, especially when used for color television.

The relation between a color region signal of a uniform color space (L*a*b* or L*u*v*) and the three stimulus values X, Y, and Z is not shown here, as it is well known to those skilled in the art.

These uniform color spaces have an advantage that it is easy to confirm visually the colors of the specified color regions. However, it is also possible to specify color regions within the data values of r, g, and b, since the reproduction colors can be determined by the data values of the three primary colors.

As described above, when specifying a color region using a parameter different from the color region signal of the HVC color space, the table Tb1 for the color region discriminator 562 should be modified accordingly.

(3) In the region discriminator 56 having the structure shown in FIG. 6, the color region information COL from the color region discriminator 562 is inputted to the uniform density region/edge portion discriminator 564, as indicated by the broken line in FIG. 6, to generate the uniform density region/edge portion information EG in accordance with a specific standard set for each color region.

More specifically, edge detection threshold values Vth set in the uniform density region/edge portion discriminator 564, with the number of the threshold values corresponding to the color regions set in the color region discriminator 562. The uniform density region/edge portion discrimination is performed using the threshold values Vth corresponding to the color regions. In this way, more detailed information EG of the uniform density regions and edge portions can be obtained, and the quality of reproduction images can be improved even further.

(4) In specifying the corrective conditions by the MTF corrective condition deciding unit 57, the intensity of smoothing is set at three degrees, i.e., strong, medium, and mild. However, the intensity of smoothing can be more minutely divided, and the number of smoothing filters becomes larger, accordingly.

As for the edge emphasizing process, the intensity of edge emphasizing can also be set at various degrees so that edge emphasizing can be performed flexibly in accordance with images to be reproduced.

(5) Although smoothing is performed using the smoothing filters 5821 to 5823 in the MTF correction unit 58, the following technique can also be employed to improve the effects of the smoothing.

When smoothing filters are used as described above, weighting addition is performed mechanically even if noise exists around the central pixel. So, the noise may have some influence on the reproduction image.

Instead of basing smoothing on all the periphery pixels around the central pixel, some periphery pixels can be extracted if the differences between the values H*, V, and C* of the selected periphery pixel and the values H*, V, and C* of the central pixel are within the allowable ranges dh, dv, and dc. The mean value of the density data of the selected pixels is determined and used in smoothing as the density data of the central pixel.

More specifically, this process is performed as follows.

(5-1) The image data of R, G, and B are converted into the data of the reproduction colors C, M, Y, and K, and the uniform color space data of H*, V, and C*.

(5-2) The data of H*, V, and C* of the pixels within a certain range with the central pixel being at the center are sampled.

For instance, a 5×5 digital filter is prepared, and the pixels within the range are sampled (data numbers DTj [j=1 to 25, hereinafter the letter "j" refers to the same] are allocated to the sampled pixel data, and the values H*, V, and C* of each pixel are referred to as DTHj, DTVj, and DTCj, respectively).

The differences between the central pixel values and each peripheral pixel values H*, V, and C* are detected, and it is determined whether the absolute values of the result are smaller than dh, dv, and dc which are the predetermined ranges for H*, V, and C*. More specifically, it is determined whether the result of the subtraction is |DTHj−DTH13|<dh, |DTVj−DTV13|<dv, and |DTC1−DTC13|<dc. Pixels which meet all of the three conditions are sampled, and these sampled pixels, as well as the central pixel, are then averaged.

(5-3) With the number of the pixels to be averaged being p (p=1 to 25), the pixels are re-numbered from 1 to P. Then, the data values of C, M, Y, and K of the pixels are set at DTmi (m=C, M, Y, or K, i=1 to p), and the mean value DTam of the data of each reproduction color of the pixels to be averaged is determined by the following Equation (6).

$$DTma = -\Sigma DTmi \qquad (6)$$

The resultant mean values are the data values of C, M, Y, and K of the central pixel DT13.

Thus, smoothing is performed by repeating the process described above.

Generally, pixels which cause noise on the reproduction image are considered to have HVC values that are extremely different from the others, and therefore smoothing can be performed by excluding the noise pixels from the other pixels to be averaged. In this way, smooth reproduction images can be obtained without noticeable image noise.

In this case, the intensity of smoothing is determined depending on the allowable ranges dh, dv, and dc. Generally, as the allowable ranges get larger, the mean values of more pixels can be sampled, making the smoothing intensity greater. Even if the allowable ranges are a bit wider than usual, most noise pixels can be excluded from the pixels to be averaged, because the HVC values of the noise pixels are outstandingly different from the value of the central pixel.

FIG. 14 shows an example of table Tb3 for determining the intensity of smoothing in the uniform density regions, which is set in the MTF corrective condition deciding unit 57 when smoothing is performed as described above.

In the table Tb3, dho, dvo, and dco indicate the allowable error ranged of the data values H*, V, and C* and the central pixel when performing soft smoothing. With these values of the data being the standard values, the allowable ranges are set for each color region, making the table Tb3 correspond to the smoothing intensity on the uniform density regions shown in FIG. 9.

In this smoothing process, three parameters dh, dv, and dc are set as the deciding factors when determining smoothing intensity. Compared with the method shown in FIG. 9, this smoothing method has the advantage that more minute smoothing can be performed in accordance with the characteristics of each color region.

In the table Tb3, for instance, no hard smoothing is required for the hue of the sky blue color region of the specified color region 2. For the lightness and saturation, however, the allowable ranges are wider so that hard smoothing is required. As for the light gray region of the specified color region 3, there is no limit for the standard value for the hue because light gray is an achromatic color, while the allowable range of the saturation is narrowed to eliminate noise of chromatic colors as much as possible, so that the saturation can be maintained at a low level.

(6) In the above embodiment, the number of copies to be made, magnification, and other information are stored in an IC card to be set in the operation panel. However, a plurality of IC cards containing correction data of various threshold values shown in the tables Tb1–Tb3 are prepared, when the MTF corrective conditions needs modifying depending on the type of the original (especially depending on whether the original contains a photographic image). The corrective data is read from a suitable IC card, and the image signal processing unit 120 operates in accordance with the data. Thus, excellent images can be reproduced regardless of the type of the original. This external recording medium is not limited to IC card, and it can take other forms such as floppy disk.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
    an input unit for receiving pixel data on colors of pixels constituting an original image;
    a first discriminator for determining to which color region each received pixel data belongs;
    a condition deciding unit for determining MTF corrective conditions for said pixel data of each color region determined by said first discriminator based on the color of the color region;
    an MTF correction unit for performing MTF corrections on said received pixel data according to said MTF corrective conditions determined for each color region by said condition deciding unit; and
    an output unit for outputting said pixel data which have been subjected to MTF correction.

2. An image processing apparatus according to claim 1, further comprising a region signal generator for generating color region signals of hue, lightness, and saturation from said pixel data, wherein
    said pixel data comprise density data of R, G, and B.

3. An image processing apparatus according to claim 2, wherein said first discriminator has a decision table containing ranges of said color region signals of hue, lightness, and saturation generated by said region signal generator, and determines to which color region each pixel data belongs according to said decision table.

4. An image processing apparatus according to claim 1, further comprising:
    a region signal generator for generating color region signals of L*, a*, and b* from said pixel data; and
    said first discriminator has a decision table containing ranges of said color region signals of L*, a*, and b* generated by said region signal generator, and determines to which color region each pixel data belongs according to said decision table, wherein
    said pixel data comprise density data of R, G, and B.

5. An image processing apparatus according to claim 1, further comprising
    a second discriminator for determining whether each received pixel data belongs to an edge portion or whether said received pixel data belongs to a uniform density region, wherein
        said condition deciding unit determines MTF corrective conditions according to discrimination results obtained by both said first discriminator and said second discriminator.

6. An image processing apparatus according to claim 5, wherein said MTF correction unit comprises a smoothing unit and an edge emphasizing unit.

7. An image processing apparatus according to claim 5, wherein said condition deciding unit determines a smoothing condition for each color region to which pixel data in uniform density regions belongs, and sends said determined smoothing condition to said MTF correction unit as a corrective condition.

8. An image processing apparatus according to claim 6, wherein said smoothing unit comprises a plurality of filters corresponding to different smoothing conditions, and performs smoothing by selecting a suitable filter.

9. An image processing apparatus according to claim 8, wherein said smoothing unit comprises filters corresponding to different smoothing conditions under which the degree of smoothness is determined to be high, low, or intermediate.

10. An image processing apparatus according to claim 8, wherein each filter of said smoothing unit performs smoothing by averaging pixel data within the window of said filter, the differences in hue, lightness, and saturation between said pixel data and the central pixel data in said window being within predetermined ranges.

11. An image processing apparatus according to claim 10, wherein said smoothing unit changes smoothing conditions by altering said ranges for each color region signal.

12. An image processing apparatus according to claim 1, wherein
    said first discriminator determines whether each received pixel data belongs to specified color regions or not, and
    said condition deciding unit determines MTF corrective conditions for said pixel data of said specified color regions, said MTF corrective conditions being different from MTF conditions for pixel data of unspecified color regions.

13. An image processing apparatus according to claim 1, further comprising:
    an external storage medium for storing data necessary for determining said MTF corrective conditions in said condition deciding unit; and
    a medium reading unit for reading data stored in said external storage medium and sends read data to said condition deciding unit, wherein
        said condition deciding unit determines corrective conditions according to said read data.

14. An image processing apparatus according to claim 13, wherein said external storage medium is an IC card.

15. An image forming apparatus comprising:
    an input unit for receiving pixel data on colors of pixels constituting an original image;
    a first discriminator for determining to which color region each received pixel data belongs;
    a condition deciding unit for determining MTF corrective conditions for said pixel data of each color region determined by said first discriminator based on the color of the color region;
    an MTF correction unit for performing MTF corrections on said received pixel data according to the conditions determined for each color region by said condition deciding unit; and
    an image forming unit for forming images according to said pixel data which have been subjected to MTF correction.

16. An image forming apparatus according to claim 15, further comprising
    a second discriminator for determining whether each received pixel data belongs to an edge portion or whether said received signal belongs to a uniform density region, wherein
        said condition deciding unit determines MTF corrective conditions according to discrimination results obtained by both said first discriminator and said second discriminator.

17. An image forming apparatus according to claim 16, wherein said MTF correction unit performs one of smoothing and edge emphasizing on said received pixel data.

18. An image forming apparatus according to claim 17, wherein said condition deciding unit determines a smoothing condition for each pixel data in uniform density regions and also determines whether edge emphasizing is required in edge portions.

19. An image processing method comprising the steps of:
  (1) receiving pixel data on colors of pixels constituting an original image;
  (2) determining to which color region each received pixel data belongs;
  (3) determining MTF corrective conditions for said pixel data of each color region determined in step (2) based on the color of the color region;
  (4) performing MTF corrections on said received pixel data according to said MTF corrective conditions determined for each color region in step (3); and
  (5) outputting said pixel data which have been subjected to MTF correction.

20. An image processing method according to claim 19, wherein said step of determining MTF corrective conditions includes the step of determining smoothing conditions for said pixel data in uniform density regions.

21. An image processing method according to claim 19, wherein
  said step of determining MTF corrective conditions includes the step of determining whether each received pixel data belongs to a specified color region or not, and
  said step of performing MTF corrections includes the step of determining MTF corrective conditions for said pixel data of specified color regions, said MTF corrective conditions being different from MTF corrective conditions for pixel data of unspecified color regions.

22. An image forming method comprising the steps of:
  (1) receiving pixel data on colors of pixels constituting an original image;
  (2) determining to which color region each received pixel data belongs;
  (3) determining MTF corrective conditions for said pixel data of each color region determined in step (2) based on the color of the color region;
  (4) performing MTF corrections on said received pixel data according to said MTF corrective conditions determined for each color region in step (3); and
  (5) forming images according to said pixel data which have been subjected to MTF correction.

23. An image forming method according to claim 22, further comprising the step of
  (6) determining whether each received pixel data belongs to an edge portion or whether said received pixel data belongs to a uniform density region, and wherein
    said step of receiving pixel data includes the step of determining MTF corrective conditions according to discrimination results obtained in steps (2) and (6).

24. An image processing apparatus according to claim 1, wherein said color region includes at least one of skin color, sky blue and light gray color regions.

25. An image processing apparatus according to claim 24, wherein said MTF correction unit performs at least one of hard smoothing in a uniform density region of said skin color region, hard smoothing in a uniform density region of said sky blue region, intermediate smoothing in a uniform density region in said light gray region, and soft smoothing in a uniform density region in said unspecified color region.

26. An image processing apparatus according claim 25, wherein said MTF correction unit performs edge emphasizing on at least one of an edge portion of said sky blue region, an edge portion of said light gray region, and an edge portion of said unspecified color region.

27. An image processing apparatus according to claim 1, wherein said color of said color region is determined by hue, lightness and saturation of said pixel data.

28. An image processing apparatus according to claim 1, wherein said condition deciding unit determines MTF corrective conditions based on specific colors of the colors of the color region.

29. An image processing apparatus according to claim 1, wherein said condition deciding unit further determines MTF corrective conditions based an edge of said color region.

30. An image processing apparatus according to claim 15, wherein said color of said color region is determined by hue, lightness and saturation of said pixel data.

31. An image processing apparatus according to claim 15, wherein said condition deciding unit determines MTF corrective conditions based on specific colors of the colors of the color region.

32. An image processing apparatus according to claim 15, wherein said condition deciding unit further determines MTF corrective conditions based an edge of said color region.

33. An image processing method according to claim 19, wherein said color of said color region is determined by hue, lightness and saturation of said pixel data.

34. An image processing method according to claim 19, wherein said condition deciding step determines MTF corrective conditions based on specific colors of the colors of the color region.

35. An image processing method according to claim 19, wherein said condition deciding step further determines MTF corrective conditions based an edge of said color region.

36. An image processing method according to claim 22, wherein said color of said color region is determined by hue, lightness and saturation of said pixel data.

37. An image processing method according to claim 22, wherein said condition deciding step determines MTF corrective conditions based on specific colors of the colors of the color region.

38. An image processing method according to claim 22, wherein said condition deciding step further determines MTF corrective conditions based an edge of said color region.

* * * * *